(12) United States Patent
Fujisaki

(10) Patent No.: US 6,594,449 B2
(45) Date of Patent: Jul. 15, 2003

(54) LENS BARREL DRIVE MECHANISM

(75) Inventor: Yoshifumi Fujisaki, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/928,448

(22) Filed: Aug. 14, 2001

(65) Prior Publication Data

US 2002/0021905 A1 Feb. 21, 2002

(30) Foreign Application Priority Data

Aug. 16, 2000 (JP) ........................................ 2000-246762

(51) Int. Cl.$^7$ .............................................. G03B 17/00
(52) U.S. Cl. ........................ 396/87; 396/269; 396/535
(58) Field of Search .......................... 396/87, 132–136, 396/269, 535

(56) References Cited

U.S. PATENT DOCUMENTS 4,615,600 A * 10/1986 Nakajima et al. ............ 396/259
4,772,909 A * 9/1988 Ogasawara .................. 396/136
5,640,616 A * 6/1997 Ishiguro et al. ............... 396/86

* cited by examiner

*Primary Examiner*—David Gray
(74) *Attorney, Agent, or Firm*—Greenblum & Bernstein, P.L.C.

(57) ABSTRACT

A lens barrel drive mechanism includes a system for detecting the number of revolutions of the output shaft of a motor, which is associated with the amount of extension of the lens barrel to which the rotating force of a gear in a gear train is transmitted. The system is provided in the generally triangular space between a cell compartment and a film cartridge compartment in a camera body.

12 Claims, 5 Drawing Sheets

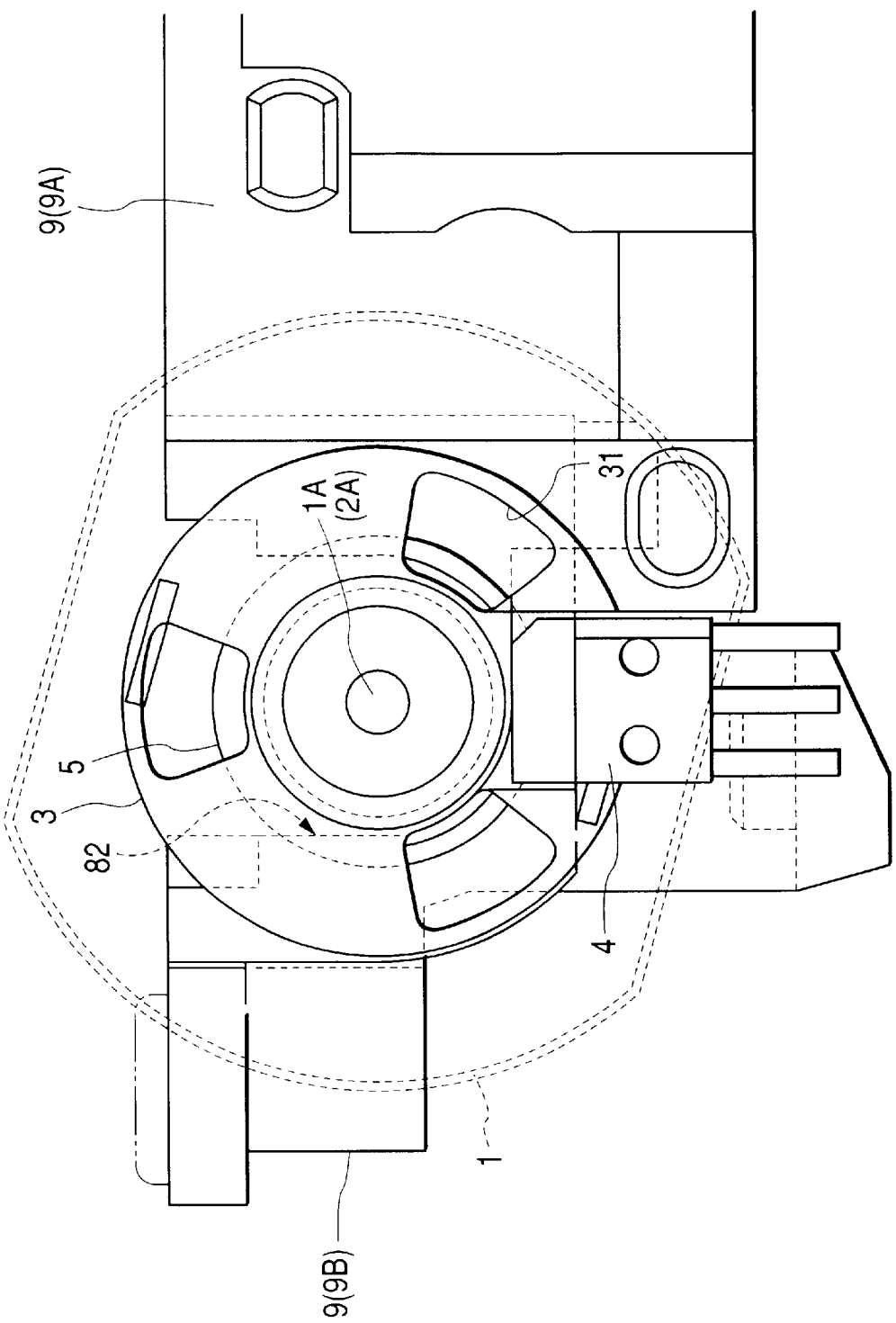

LENS BARREL DRIVE MECHANISM

BACKGROUND OF THE INVENTION

The present invention relates to a lens barrel drive mechanism which drives a lens barrel such as for driving a zooming mechanism.

To perform auto-focusing, zooming and other camera actions, the lens barrel in the camera has to be moved back and forth, and various types of lens barrel drive mechanism have been proposed and developed. A typical lens barrel drive mechanism comprises a motor, a drive gear secured to the output shaft of the motor and a reduction gear train for reducing the number of revolutions of the drive gear.

In order to obtain maximum accuracy in adjustment while focusing or zooming the lens using such lens barrel drive mechanism, it is important that the amount of movement of the lens barrel be controlled accurately. To meet this need, it has been proposed that the lens barrel drive mechanism of the type under consideration be equipped with a system for detecting the amount of movement of the lens barrel which includes a pulse plate provided parallel to the first gear or an intermediate gear in the reduction gear train and which rotates integrally with that gear and a photo-interrupter which is so shaped as that parts of the photo-interrupter are located on both sides of the pulse plate.

This detection system is usually installed in a limited space within the small camera body, so considerable difficulty is encountered in the mounting procedure. In particular, the pulse plate inevitably has only a limited area to put in because as already mentioned it is provided parallel to each of the gears in the reducing gear train. Therefore, in an attempt to secure a wide enough area for installing the pulse plate and other elements of the detection system, a certain part of the camera body such as the lower part is extended. However, this is unfavorable to the purpose of reducing the size of the camera body.

Further, gears with a smaller number of teeth must be used to increase the rotating speed of the pulse plate sufficiently to achieve precise detection of the amount of lens barrel movement. This adds the further increase of the required installation space and the manufacturing cost is increased accordingly.

SUMMARY OF THE INVENTION

The present invention has been accomplished under these circumstances and has as an object providing a lens barrel drive mechanism that meets the purpose of achieving compactness by not requiring any additional space to install the system of detecting the amount of lens barrel movement and which can be fabricated at minimum cost without compromising the essential need for precise detection of the amount of lens barrel movement.

According to the present invention, the detecting system is provided in a generally triangular space between a cell compartment and a film cartridge compartment in the camera body.

The detecting system is provided not in an additionally created space but in the heretofore unused dead space and this is favorable to the purpose of reducing the size of the camera body.

Further, if the detecting system is directly coupled to the output shaft of the fast rotating motor, it is possible to dispense with any accelerating mechanism such as a gear or gears with a smaller number of teeth that have been necessary in the related art. That is, the amount of lens barrel movement can be detected with high precision and it is possible to realize a compact and precise lens barrel drive mechanism with minimum increase in the manufacturing cost.

As a preferred embodiment, the present invention provides a lens barrel drive mechanism having a worm secured to an output shaft of a lens barrel drive motor and a gear train by which the rotating force of a worm wheel meshing with said worm is transmitted to the lens barrel, said drive mechanism further including a system of detecting the number of revolutions of said output shaft as associated with the amount of extension of said lens barrel, said system being provided in the generally triangular space between a cell compartment and a film cartridge compartment in the camera body.

It is more preferable that the worm is provided at the initial stage of the gear train which is directly coupled to said output shaft, and said number-of-revolutions detecting system is provided on said worm.

The number-of-revolutions detecting system may comprise a pulse plate secured to a rotating shaft which rotates integrally with the worm, and a photo-interrupter which detects the rotation of said pulse plate.

The present disclosure relates to the subject matter contained in Japanese patent application No. 2000-246762 (filed on Aug. 16, 2001), which is expressly incorporated herein by reference in its entirety.

BRIEF DESCRIPTION OF THE DRAWINGS

FIG. 5 is a bottom view showing enlarged the drive mechanism.

DESCRIPTION OF THE PREFERRED EMBODIMENT

A preferred embodiment of the present invention is described below with reference to the accompanying drawings.

Figure 1:
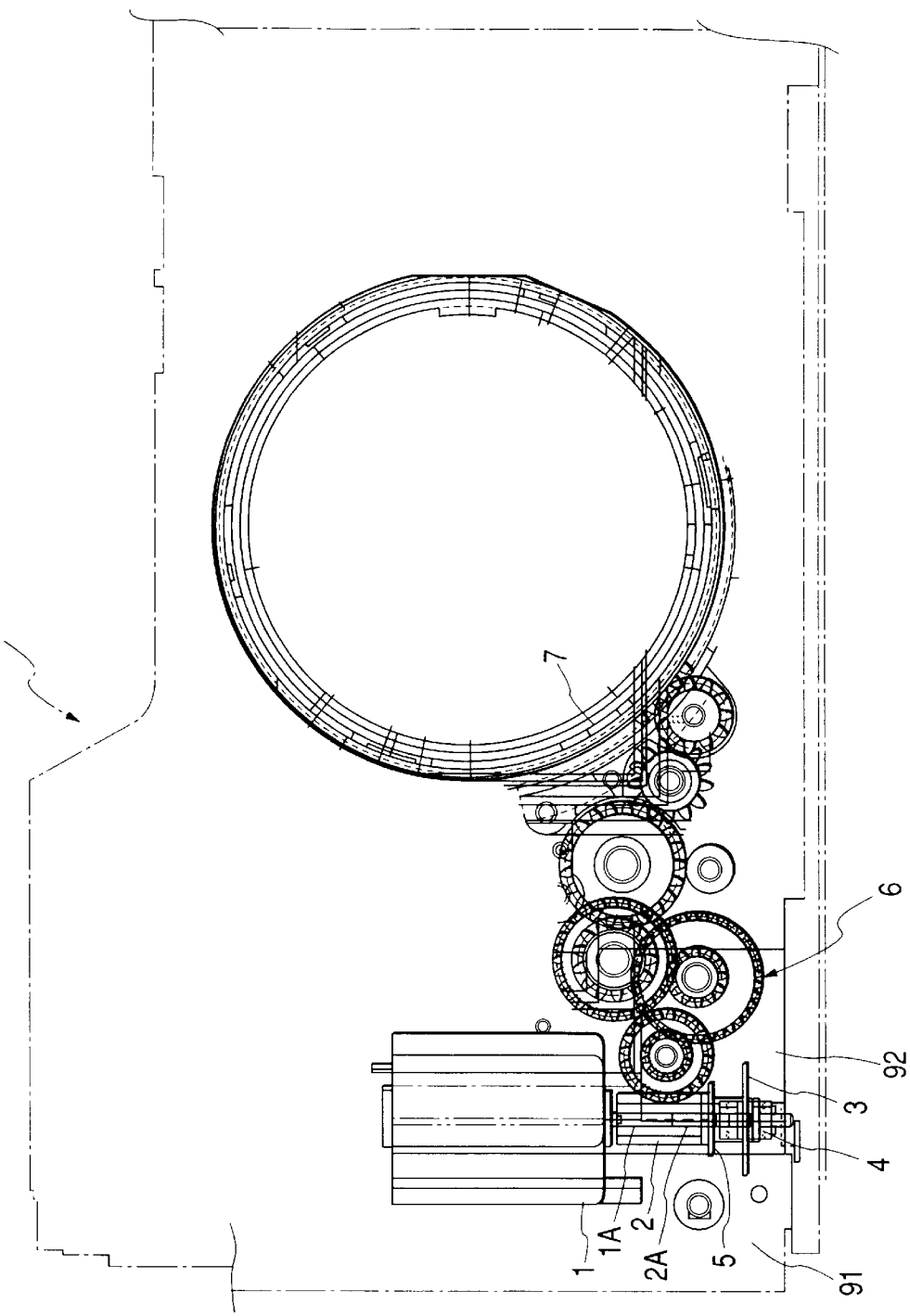
FIG. 1 is a front view showing the interior of a camera body equipped with a lens barrel drive mechanism of the invention.

FIG. 1 shows a camera body that has a lens barrel drive mechanism of the invention, and which is generally indicated by 9. The lens barrel drive mechanism comprises a zooming motor 1, a worm 2 secured to the output shaft 1A of the motor 1, a pulse plate 3 provided on the rotating shaft 2A of the worm 2, a photo-interrupter 4 of such a shape that parts of the photo-interrupter 4 are located on both sides of the pulse plate 3, a flange 5 provided on the rotating shaft 2A between the pulse plate 3 and the worm 2, and a gear train 6. Indicated by 7 is the lens barrel.

Figure 2:
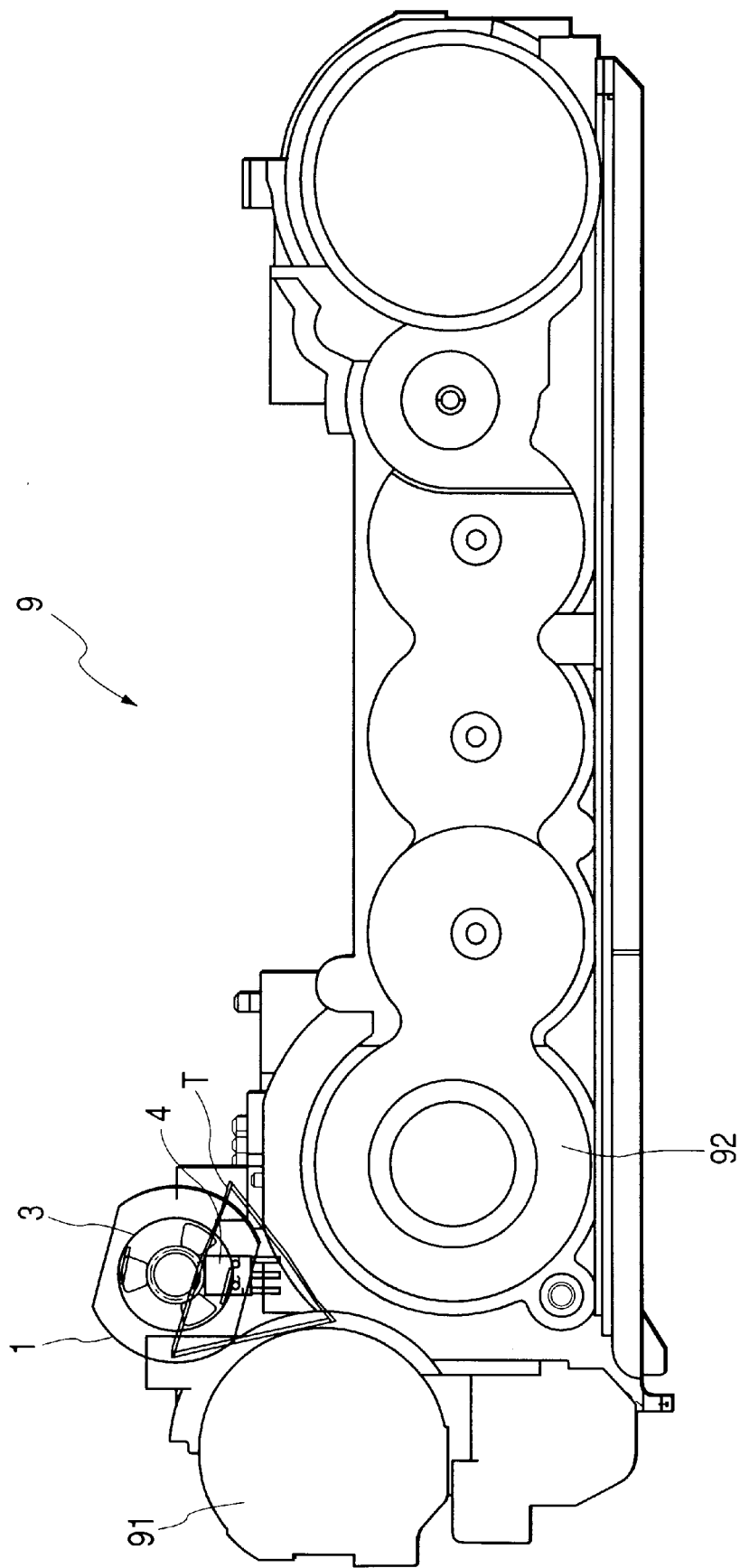
FIG. 2 is a bottom view showing the essential part of the drive mechanism.

The motor 1 is installed in the lower right part of the camera body 9 (lower left as seen from the front) and, as FIGS. 1 and 2 show, the motor 1 is placed in the vicinity of a cell compartment 91 and a film cartridge compartment 92 in a vertically standing state (i.e. in a state in which the rotational axis of the motor 1 is oriented vertically) to define a generally triangular dead space (hereunder referred to simply as "triangular space T").

The worm 2 reduces the fast revolution of the output shaft 1A of the motor 1 to transmit the speed-reduced rotation to the gear train 6. The worm 2 is placed immediately below the motor 1 in a vertically standing state (i.e. in a state in which the rotational axis of the worm 2 is oriented vertically). The worm 2 has a shaft hole 23 bored in the center of the basal end face 21 and extending through the distal end face 22. The output shaft 1A of the motor 1 (which also serves as the rotating shaft 2A of the worm 2) is pressed into the shaft hole 23 and fixed as an integral part of the worm 2 which is cantilevered as it is driven to rotate by the motor 1. By means of the worm 2, a rotating action in a vertical direction in the camera body 9 is subjected to orthogonal transformation to a rotating action in a horizontal direction; as the result, the rotating force is transmitted to the gear train having horizontal rotating shafts.

As the power is transmitted from the worm 2 to the gear train 6, the reaction from the gear train 6 may potentially cause the worm 2 to be disengaged from the distal end of the output shaft 1A. To prevent this situation, a press plate 81 is provided in the camera body 9, particularly in a gear mount 9A to be described later, such that it is close enough to face the distal end of the output shaft 1A. Hence, the press plate 81 effectively prevents the worm 2 from being disengaged from the output shaft 1A.

Figure 3:
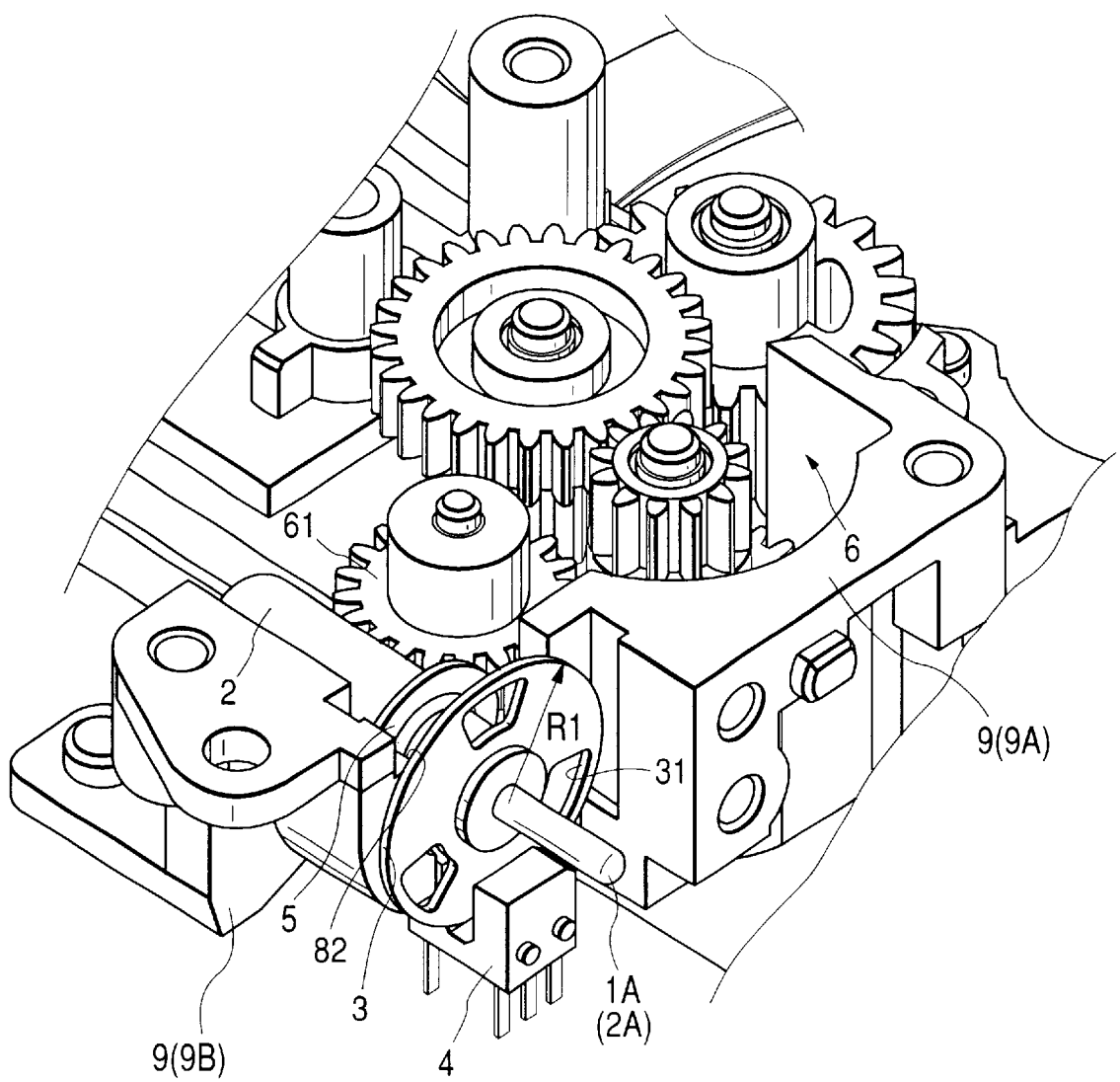
FIG. 3 is a simplified perspective view of the drive mechanism.

The pulse plate 3 is a part of the number-of-revolutions detecting system and, as FIG. 3 shows, it is a disk with a radius of R1 that is fixed integrally to the output shaft 1A. In the embodiment under consideration, the pulse plate 3 has three through-holes 31 spaced apart by 120 degrees. The pulse plate 3 is directly coupled to the output shaft 1A of the fast rotating motor 1, so unlike the related art which is provided on a speed reducing gear train, it is capable of precise position detection without increasing speed such as by using a gear or gears with a smaller number of teeth.

The photo-interrupter 4 is a part of the number-of-revolutions detecting system. By optically detecting and counting the number of light passing through the holes 31 in the pulse plate 3, the photo-interrupter 4 detects the number of revolutions of the pulse plate 3 as the pulse plate 3 rotates together with the output shaft 1A, thereby calculating the amount of lens barrel movement.

The flange 5 prevents the photo-interrupter 4 from being fouled by a lubricant oil such as grease that has been applied to the area around the output shaft 1A of the motor 1 and to the worm 2. Being generally shaped like a disk having a radius of R2 (<R1), the flange 5 is provided on the rotating shaft 2A between the distal end face 22 of the worm 2 and the pulse plate 3 in a position that is closer to the worm 2 than to the photo-interrupter 4.

Figure 4:
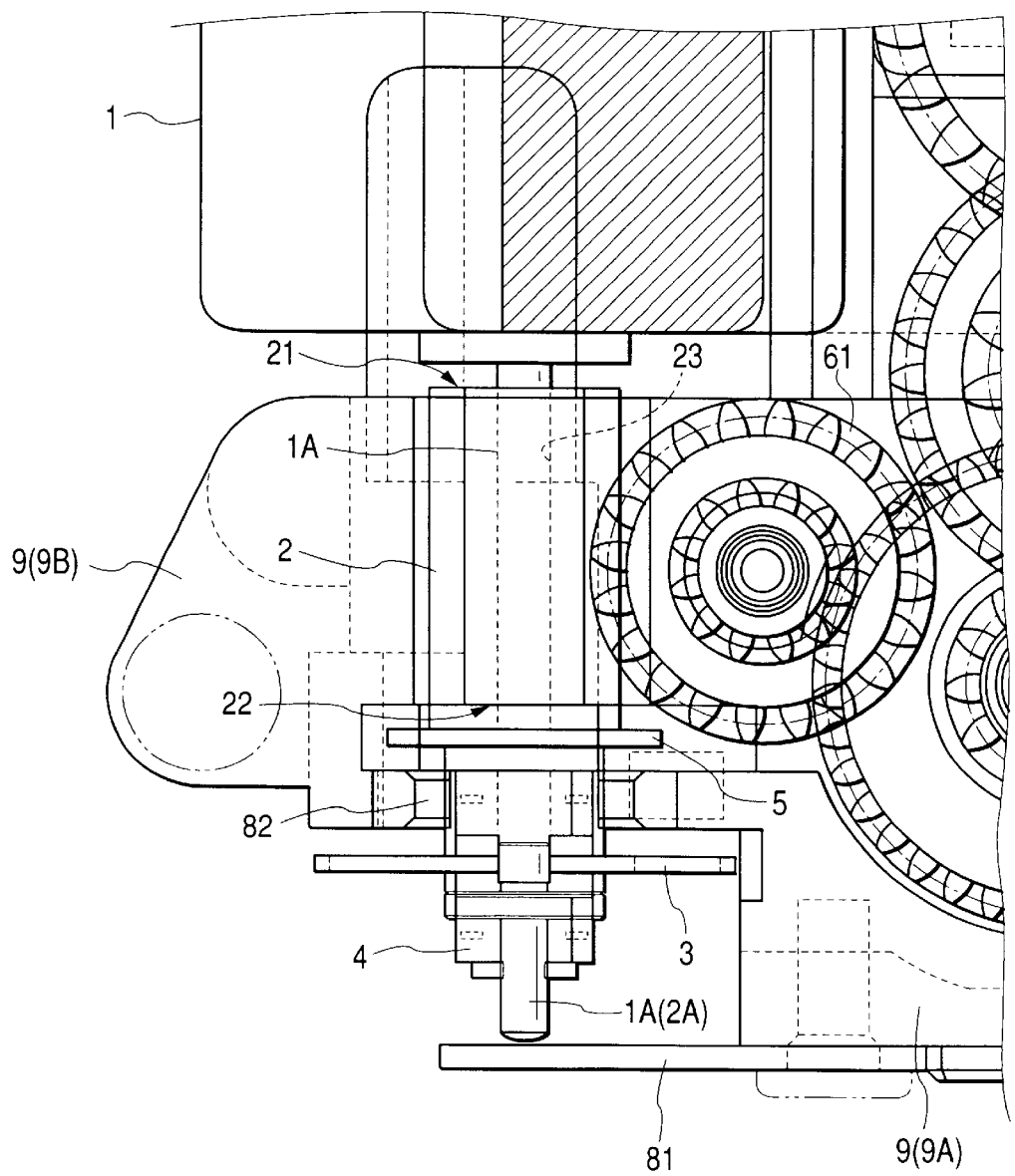
FIG. 4 is a front view showing enlarged the essential part of the drive mechanism.

In order to produce the torque necessary for lens barrel extension, the rotating action decelerated by the worm 2 is further decelerated by the gear train 6 before it is transmitted to the lens barrel. The gear train 6 in the embodiment under consideration has a plurality of gears including a worm wheel 61 meshing with the worm 2 and the gear train 6 is fitted in the gear train mount 9A of the camera body 9. As clearly shown in FIGS. 4 and 5, the camera body 9 has a projection 9B that extends laterally from the gear train mount 9A to pass around beneath the worm 2, and a U-shaped rib 82 is formed on the projection 9B as an anti-scatter wall.

The rib 82 as well as the flange 5 effectively prevents scattering of the lubricant oil applied to the worm 2 and any other necessary parts, and the rib 82 is so provided between the flange 5 and the pulse plate 3 as to surround the lower half of the output shaft 1A. If desired, another rib having a suitable shape such as one being convex downward or an inverted U may be additionally provided as an integral part of (or separate part from) the press plate 81. Since the rib 82 surrounds the lower half of the output shaft 1A in the area between the flange 5 and the pulse plate 3, said another rib may be provided as a complement to surround the open upper half of the same output shaft 1A. As the result, the pulse plate 3 and the photo-interrupter 4 are isolated almost completely from the worm 2 to ensure more positive avoidance of scattering of the lube oil.

Therefore, in the embodiment under consideration, the number-of-revolutions detecting system comprising the pulse plate 3 and the photo-interrupter 4 can be installed in the triangular dead space without increasing the size of the camera body 9.

A further advantage of this embodiment is that even if the grease or other lubricant oil as applied to the output shaft 1A and the worm 2 are scattered to various spots due, for example, to the fast rotation of the shaft 1A, at least the photo-interrupter 4 is protected by the combination of the rib 82 and the flange 5. Hence, the photo-interrupter 4 is positively prevented from being fouled by the lube oil and can count the number of light passes through the holes 31 in the pulse plate 3 accurately. This effectively prevents the occurrence of errors during the detection of the amount of lens barrel movement and system reliability is enhanced.

What is claimed is:

1. A lens barrel drive mechanism in a camera body having a cell compartment and a film cartridge compartment which are located adjacent to each other, wherein an axis of the cell compartment and an axis of the film cartridge compartment are parallel to one another, the lens barrel drive mechanism comprising:

a motor for driving a lens barrel, said motor including an output shaft rotatable about an axis parallel to the axes of the cell compartment and the film cartridge compartment; and a detector for detecting the number of revolutions of the output shaft of said motor for determining the amount of driving of the lens barrel, wherein said detector is located in the camera body in a space substantially circumscribed by said motor, the cell compartment and the film cartridge compartment.

2. The lens barrel drive mechanism according to claim 1, further comprising:

a worm fixed to the output shaft of said motor; and a gear train which transmits rotation of a worm wheel meshing with said worm to the lens barrel.

3. The lens barrel drive mechanism according to claim 1, wherein said detector comprises:

a pulse plate fixed to the output shaft of said motor; and a photo-interrupter which detects rotation of said pulse plate.

4. The lens barrel drive mechanism according to claim 2, wherein said detector comprises:

a pulse plate fixed to the output shaft of said motor; and a photo-interrupter which detects rotation of said pulse plate.

5. The lens barrel drive mechanism according to claim 4, further comprising:

a flange provided around he output shaft of said motor between said worm and said pulse plate, wherein said flange functions as an oil barrier between said worm and said pulse plate.

6. The lens barrel drive mechanism according to claim 4, further comprising:

a wall provided between said worm and said pulse plate, wherein said wall functions as an oil barrier between said worm and said pulse plate.

7. A lens barrel drive mechanism installed in a camera body having a cell compartment and a film cartridge compartment which are located adjacent to each other, the film cartridge compartment having an axis, the lens barrel drive mechanism comprising:

a motor for driving a lens barrel, said motor including an output shaft rotatable about an axis parallel to the axis of the film cartridge compartment;

a worm fixed to the output shaft of said motor and rotatable about an axis parallel to the axis of the film cartridge compartment;

a gear train including a worm wheel meshing with said worm and rotatable about an axis orthogonal to the axis of the film cartridge compartment;

a pulse plate fixed to the output shaft of said motor and rotatable about an axis parallel to the axis of the film cartridge compartment;

a photo-interrupter which detects rotation of said pulse plate;

a flange provided around he output shaft of said motor between said worm and said pulse plate; and a wall provided between aid worm and said pulse plate, wherein said flange and said wall function as an oil barrier between said worm and said pulse plate.

8. The lens barrel drive mechanism according to claim 7, wherein the output shaft of aid motor, said worm and said pulse plate are disposed coaxially with one another.

9. The lens barrel drive mechanism according to claim 8, wherein said motor, the output shaft, and said worm are disposed adjacent to the cell compartment and the film cartridge compartment.

10. The lens barrel drive mechanism according to claim 7, wherein said pulse plate and said photo-interrupter are disposed in the camera body in a space substantially circumscribed by said motor, the cell compartment and the film cartridge compartment.

11. A lens barrel drive mechanism installed in a camera body, the lens barrel drive mechanism comprising:

a motor for driving a lens barrel, said motor including an output shaft rotatable about an axis;

a worm fixed to the output shaft of said motor;

a gear train including a worm wheel meshing with said worm and rotatable about an axis orthogonal to the axis of the output shaft of said motor;

a pulse plate fixed to the output shaft of said motor;

a photo-interrupter which detects rotation of said pulse plate; and a flange provided around he output shaft of said motor between said worm and said pulse plate, wherein said flange functions as an oil barrier between said worm and said pulse plate.

12. The lens barrel drive mechanism according to claim 11, further comprising:

a wall provided between aid worm and said pulse plate, wherein said wall functions as an oil barrier between said worm and said pulse plate.

* * * * *